(12) United States Patent
Hwang et al.

(10) Patent No.: US 7,097,942 B2
(45) Date of Patent: Aug. 29, 2006

(54) FLUORIDE COPOLYMER, POLYMER ELECTROLYTE COMPRISING THE SAME AND LITHIUM BATTERY EMPLOYING THE POLYMER ELECTROLYTE

(75) Inventors: Seung-sik Hwang, Seongnam (KR); Myung-dong Cho, Yongin (KR)

(73) Assignee: Samsung SDI Co., Ltd., Suwon (KR)

( * ) Notice: Subject to any disclaimer, the term of this patent is extended or adjusted under 35 U.S.C. 154(b) by 458 days.

(21) Appl. No.: 10/238,714

(22) Filed: Sep. 11, 2002

(65) Prior Publication Data
US 2003/0124431 A1    Jul. 3, 2003

(30) Foreign Application Priority Data
Oct. 17, 2001   (KR) .................. 2001-63952

(51) Int. Cl.
*H01M 6/18*    (2006.01)
(52) U.S. Cl. ................ 429/316; 429/317; 429/309; 429/307; 252/62.2
(58) Field of Classification Search ............. 429/316, 429/317, 309, 307, 306; 252/62.2
See application file for complete search history.

(56) References Cited
U.S. PATENT DOCUMENTS

| | | | |
|---|---|---|---|
| 4,830,939 A | 5/1989 | Lee et al. ................ 429/192 |
| 5,463,179 A | 10/1995 | Chaloner-Gill et al. ...... 429/192 |
| 5,728,489 A * | 3/1998 | Gao et al. .................... 429/309 |
| 6,596,440 B1 * | 7/2003 | Gavelin et al. ............. 429/306 |
| 2002/0028387 A1 * | 3/2002 | Gavelin et al. ............. 429/303 |

FOREIGN PATENT DOCUMENTS

| | | |
|---|---|---|
| JP | 3-207752 | 9/1991 |
| JP | 2000-226419 | 8/2000 |

OTHER PUBLICATIONS

Gavelin et al. "Amphiphilic polymer gel electrolytes. 3. Influence of the ionophobic-ionophilic balance on the ion conductive properties", Electrochemica Acta 46 (10-11), (2001), pp. 1439-1446.*

* cited by examiner

*Primary Examiner*—Laura Weiner
(74) *Attorney, Agent, or Firm*—Lee & Morse, P.C.

(57) ABSTRACT

Provided are a fluoride copolymer, a polymer electrolyte comprising the fluoride copolymer, and a lithium battery employing the polymer electrolyte. The polymer electrolyte preferably includes as the fluoride copolymer at least one fluoride polymer selected from a polyethylene glycol methylether (meth)acrylate (PEGM)A)-2,2,2-trifluoroethylacrylate (TFEA) polymer, a PEGMA-TFEA-acrylonitrile (AN) polymer, a PEGMA-TFEA-methyl methacrylate (MMA) polymer, a PEGMA-TFEA-vinylpyrrolidone (VP) polymer, a PEGMA-TFEA-trimethoxyvinylsilane (TMVS) polymer, and a PEGMA-TFEA-ethoxy ethylacrylate (EEA) polymer.

8 Claims, 7 Drawing Sheets

FLUORIDE COPOLYMER, POLYMER ELECTROLYTE COMPRISING THE SAME AND LITHIUM BATTERY EMPLOYING THE POLYMER ELECTROLYTE

BACKGROUND OF THE INVENTION

1. Field of the Invention

The present invention relates to a fluoride copolymer, a polymer electrolyte and a lithium battery employing the polymer electrolyte. More particularly, the invention relates to a fluoride polymer, to a polymer electrolyte that can be used for electrochemical devices such as lithium batteries and that has good mechanical properties and ionic conductivity characteristics, and to a lithium battery having improved charging/discharging characteristics.

2. Description of the Related Art

According to the rapid development of various electronic devices and computer-related industry, there has been an increasing demand for highly efficient secondary batteries. To meet the demand, characteristic requirements of secondary batteries include, for example, safety, portability, compactness, and the like.

Typical batteries satisfying the foregoing requirements are lithium polymer batteries that most expect to be the next-generation secondary batteries. Lithium polymer batteries can overcome several shortcomings of lithium ion batteries that currently are being put into widespread use, including such shortcomings as safety problems, high material costs, difficulty in manufacturing large scale batteries, and difficulties in attaining high-capacity batteries. Development of polymer electrolytes with high ionic conductivity, good mechanical properties for better manageability, and high electrochemical stability is a prerequisite for achieving practicality of lithium polymer batteries.

Recently known polymer batteries include hybrid polymer electrolytes containing an organic electrolytic solution, gel-type polymer electrolytes and the like. Hybrid polymer electrolytes can minimize problems encountered in liquid electrolytes. However, they still have several disadvantages including a complicated production process due to the need to extract a plasticizer or impregnate an electrolytic solution, a safety problem in view of battery quality such as leakage, a difficulty of ensuring reproducibility, and the like.

Gel-type polymer electrolytes, on the other hand, can be prepared by mixing solid polymers and organic electrolytic solution at an initial manufacture stage to be cast. Thus, there is no need to perform a subsequent injection process of an electrolytic solution. Also, since the electrolytic solution is mixed with solvents from the initial manufacture stage, the electrolytic solutions can be uniformly distributed throughout the battery. Further, since a large amount of liquid electrolytes are impregnated into a polymer matrix after casting, the ionic conductivity can advantageously be increased.

Examples of the gel-type polymer electrolytes include polymer electrolytes prepared by adding organic electrolytic solutions to polymer resins such as polymethylmethacrylate (PMMA), polyacrylonitrile (PAN) or polyvinylchloride (PVC). Such a polymer electrolyte is comprised of a polymer resin having a bipolar moment, in which lithium salts are dissolved in an organic solvent, and exhibits high ionic conductivity of $10^{-3}$ S/cm or higher, at room temperature, when the organic solvent and the lithium salts are mixed at an optimum ratio. However, gel-type polymer electrolytes still have several problems, such as a complicated battery manufacturing process, or an increased cost because the manufacturing process requires a high temperature drying step at 100° C. or higher, and the resin has a high viscosity when it is molten.

Another example of gel-type polymer electrolytes is disclosed in Japanese Patent JP03-207752A, in which a polymer electrolyte is prepared by mixing ethylene glycol and dimethacrylate and subjecting to the mixture UV radiation. The gel-type polymer electrolyte has an ionic conductivity of $10^{-4}$ S/cm or less, is too soft, and is thermally cured upon UV radiation, disabling further formation. Also, during battery fabrication, a gap forms between each electrode and the polymer electrolyte, and it becomes relatively larger thereby increasing the interface resistance between the electrode and polymer electrolyte, making the gel-type polymer electrolyte difficult to be practically used for secondary batteries.

U.S. Pat. No. 4,830,939, the disclosure of which is incorporated by reference herein in its entirety, discloses a polymer electrolyte prepared by mixing a polymerizable monomer having one or more unsaturated functional groups and an electrolytic solution and curing the same by UV radiation. Although this polymer electrolyte has good ionic conductivity, it undesirably has poor flexibility.

U.S. Pat. No. 5,463,179, the disclosure of which is incorporated by reference herein in its entirety, describes a method of improving the ionic conductivity of a polymer electrolyte by providing a three-dimensional stable space between molecules of a polymer by introducing relatively rigid functional groups into a polymer matrix forming the polymer electrolyte. However, according to this method, even though the ionic conductivity of the polymer electrolyte is increased to approximately $4 \times 10^{-3}$ S/cm, the interface resistance between the electrode and polymer electrolyte is relatively increased to cause a deterioration in battery performance, thereby making the polymer electrolyte difficult to be practically used.

The description herein of disadvantages of various known systems, methods, and apparatus is not intended to limit the scope of the present invention. Indeed, certain aspects of the present invention may include one or more features from known methods, apparatus, and systems without suffering from the same disadvantages.

SUMMARY OF THE INVENTION

To solve the above-described problems, it is a feature of an embodiment of the present invention to provide a fluoride polymer that can increase lithium ionic conductivity by optimizing impregnation of an organic electrolytic solution. It also is a feature of an embodiment of the invention to manufacture a polymer electrolyte having good mechanical properties, a preparation method thereof, and a polymer electrolyte prepared by employing the same. It is an additional feature of the invention to provide a lithium battery having improved charging/discharging characteristics by employing the polymer electrolyte.

In accordance with these and other features of various embodiments of the invention, there is provided a fluoride copolymer represented by Formula 1:

<Formula 1> wherein $R_1$, $R_2$ and $R_3$ are independently H or $CH_3$, $R_4$ is selected from $-C\equiv N$, $-C(=O)OCH_3$ and groups represented by the following structural formulae:

n is in the range of 1 to 45, x is in the range of 5 to 200, y is in the range of 10 to 800, and z is in the range of 0 to 2,000.

The compound represented by Formula 1 is a bi-component copolymer in the case of z being zero, and is a three-component polymer (or terpolymer) in the case of z not being zero. In the latter case, z is more preferably in the range of 100 to 1,500.

The fluoride copolymer preferably is selected from a polyethylene glycol methylether methacrylate (PEGMA)-2, 2,2-trifluoroethyl acrylate (TFEA) copolymer, a PEGMA-TFEA-acrylonitrile (AN) copolymer, a PEGMA-TFEA-methyl methacrylate (MMA) copolymer, a PEGMA-TFEA-vinylpyrrolidone (VP) copolymer, a PEGMA-TFEA-trimethoxyvinylsilane (TMVS) copolymer, and a PEGMA-TFEA-ethoxy ethyl acrylate (EEA) copolymer.

The weight average molecular weight of the fluoride copolymer preferably is within the range of from about 15,000 to about 1,000,000.

In accordance with an additional feature of an embodiment of the invention, there is provided a method of preparing a fluoride copolymer represented by Formula 1, comprising polymerizing a monomer mixture of PEGMA represented by Formula 2 and 2,2,2-trifluoroethyl methacrylate (TFEMA) represented by Formula 3:

wherein $R_1$, $R_2$ and $R_3$ are independently H or $CH_3$, $R_4$ is selected from $-C\equiv N$, $-C(=O)OCH_3$ and groups represented by the following structural formulae:

n is in the range of 1 to 45, x is in the range of 5 to 200, y is in the range of 10 to 800, and z is in the range of 0 to 2,000.

The content of the PEGMA preferably is in the range of from 10 to 50% by mol, and the content of the TFEMA preferably is in the range of from 50 to 90% by mol.

In the present invention, a monomer represented by Formula 4 may also be added to the monomer mixture, and in this case, the monomer mixture preferably includes from 5 to 50% by mole of the PEGMA, from 5 to 50% by mol of the TFEMA, and from 5 to 90% by mol of the monomer represented by Formula 4:

wherein $R_3$ is independently H or $CH_3$, and $R_4$ is selected from $-C\equiv N$, $-C(=O)OCH_3$ and groups represented by the following structural formulae:

The weight average molecular weight of the PEG MA preferably is within the range of from about 150 to about 2,100.

In accordance with another feature of the invention, there is provided a polymer electrolyte comprising a fluoride copolymer represented by Formula 1:

wherein $R_1$, $R_2$ and $R_3$ are independently H or $CH_3$, $R_4$ is selected from $-C\equiv N$, $-C(=O)OCH_3$ and groups represented by the following structural formulae:

n is in the range of 1 to 45, x is in the range of 5 to 200, y is in the range of 10 to 800, and z is in the range of 0 to 2,000.

The polymer electrolyte preferably further comprises a lithium salt selected from $LiClO_4$, $LiCF_3SO_3$, $LiPF_6$, $LiN(CF_3SO_2)_2$, $LiBF_4$, and mixtures thereof, and the content of the lithium salt preferably is in the range of from 5 to 50 parts by weight, based on 100 parts by weight of the fluoride copolymer. Also, the polymer electrolyte preferably further comprises polyethylene glycol dimethylether in order to enhance mechanical properties and ion conductivity, and the content of the polyethylene glycol dimethylether preferably is in the range of 10 to 200 parts by weight, based on 100 parts by weight of the fluoride copolymer.

Also, the polymer electrolyte may optionally further comprise an organic solvent selected from ethylene carbonate (EC), propylene carbonate (PC), dimethyl carbonate (DMC), ethylmethyl carbonate (EMC), dipropyl carbonate, diethoxy ethane, dimethoxy ethane, γ-butyrolactone, dioxolane, sulfolane, diethylene glycol dimethylether, tetraethylene glycol dimethylether, and mixtures thereof, where the content of the organic solvent preferably is in the range of from 50 to 400 parts by weight, based on 100 parts by weight of the fluoride copolymer.

Also, the polymer electrolyte of the present invention may further comprise a ceramic filler selected from silica, alumina, lithium aluminate, zeolite, and mixtures thereof, where the content of the ceramic filler may be in the range of from 10 to 50 parts by weight, based on 100 parts by weight of the fluoride copolymer.

In accordance with another feature of an embodiment of the invention, there is provided a lithium battery comprising a cathode, an anode and a polymer electrolyte comprising a fluoride copolymer represented by Formula 1 interposed between the cathode and the anode:

<Formula 1> wherein $R_1$, $R_2$ and $R_3$ are independently H or $CH_3$, $R_4$ is selected from $-C\equiv N$, $-C(=O)OCH_3$ and groups represented by the following structural formulae:

n is in the range of 1 to 45, x is in the range of 5 to 200, y is in the range of 10 to 800, and z is in the range of 0 to 2,000.

In the lithium battery of the present invention, the cathode preferably includes sulfur and the anode preferably is comprised of at least a lithium metal film. Also, the lithium battery of the present invention preferably comprises a cathode including a lithium composite oxide selected from $LiCoO_2$, $LiNiO_2$, $LiMnO_2$ and $LiMn_2O_4$, and mixtures thereof, and the anode preferably comprises carbon or graphite.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE INVENTION

Korean priority application Serial No. 2001-63952, filed on Oct. 17, 2001, and entitled: "Fluoride copolymer, polymer electrolyte comprising the same and lithium battery employing the polymer electrolyte" is hereby incorporated by reference in its entirety.

Throughout this description, the term "copolymer" denotes a polymer including at least two monomer units, and may include a polymer that includes three or more monomer units. Accordingly, reference to a fluoride copolymer is meant to include copolymers and terpolymers containing fluorine.

One embodiment of the present invention provides a fluoride copolymer (e.g., a PEGMA-TFEMA-X copolymer) represented by Formula 1:

<Formula 1> wherein $R_1$, $R_2$ and $R_3$ are independently H or $CH_3$, $R_4$ is selected from $-C\equiv N$, $-C(=O)OCH_3$ and groups represented by the following structural formulae:

where n is in the range of from 1 to 45, x is in the range of from 5 to 200, y is in the range of from 10 to 800, and z is in the range of from 0 to 2,000.

The compound represented by Formula 1 is a bi-component polymer (e.g., copolymer) in the case of z being zero, and is a three-component polymer (e.g., terpolymer) in the case of z not being zero. In the latter case, z is more preferably in the range of 100 to 1,500.

The fluoride copolymer represented by Formula 1 preferably includes PEGMA and TFEMA as repeating units, acrylonitrile (AN), methyl methacrylate (MMA), vinylpyrrolidone (VP), trimethoxyvinylsilane (TMVS), and ethoxy ethylacrylate (EEA) as additional optional repeating units, as understood from the above formula 1.

Preferably, the glass transition temperature of the fluoride copolymer is in the range of −50 to −30° C., and the weight average molecular weight thereof is in the range of from about 15,000 to about 1,000,000, more preferably in the range of from about 15,000 to about 200,000. If the weight average molecular weight of the fluoride copolymer exceeds the above range, selectivity for solvents may be reduced. If the weight average molecular weight of the fluoride copolymer falls below of the above range, mechanical properties thereof may be deteriorated.

Figure 5:
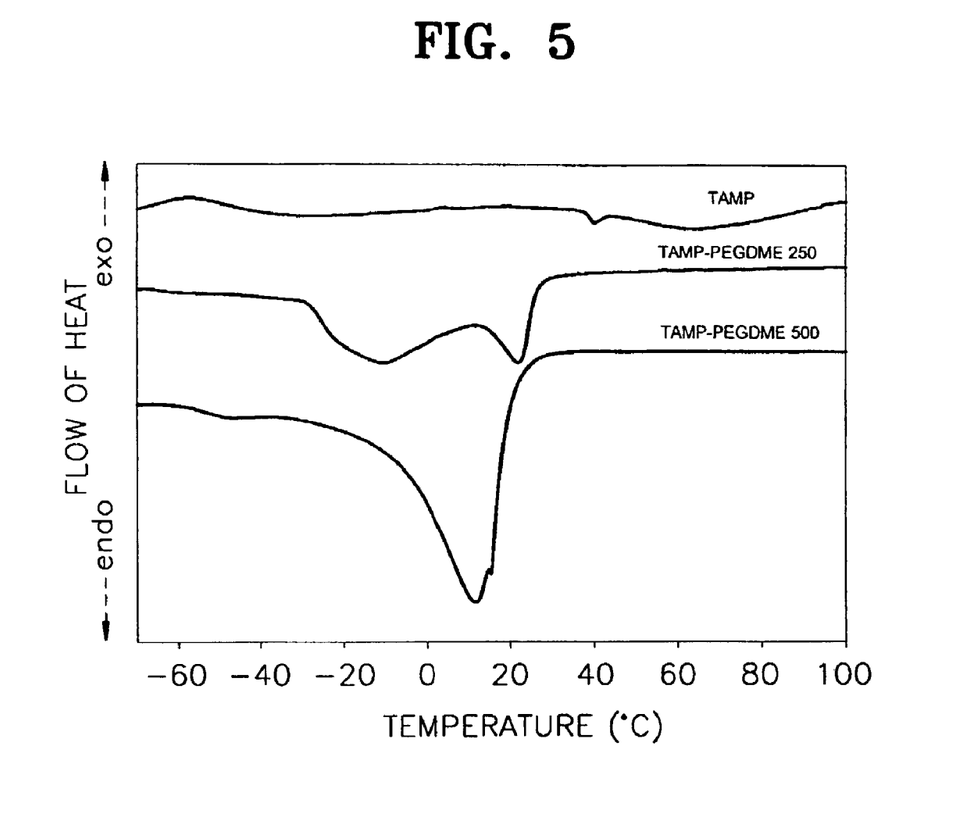
FIG. 5 is a graphical representation showing thermal analysis data of the copolymer prepared by Synthesis Example 2 and polymer electrolytes prepared by Examples 8 and 9 of the present invention using a differential scanning calorimeter (DSC)

In order to evaluate thermal characteristics of copolymers and polymer electrolytes according to the present invention, thermal analysis was performed using a DSC, and the results are shown in FIG. 5.

Since the fluoride copolymer according to the present invention preferably contains an acrylate group, it can interact with lithium ions. Polyethylene oxide in the PEGMA is believed to promote movement of dissociated lithium ions, thereby enhancing ionic conductivity. Alkyl groups including fluorine (F) atoms in the terminal of TFEMA are believed to improve the mechanical properties of a polymer layer containing the fluoride copolymer, thereby enabling manufacture of a thin film. The optional additional repeating units (X) are believed to increase affinity to an electrolytic solution and allow for introduction of desired functional groups. For example, acrylonitrile (AN), among the above-described repeating units, may be particularly introduced for the purpose of achieving electrochemical stability and increased dielectric constant.

A method of preparing the fluoride copolymer represented by Formula 1 according to the present invention will now be described. The fluoride copolymer represented by Formula 1 may be prepared by copolymerizing PEGMA represented by Formula 2 and TFEMA represented by Formula 3. The fluoride copolymer represented by Formula 1 also may be prepared by adding a monomer represented by Formula 4 to a monomer mixture of PEGMA represented by Formula 2 and TFEMA represented by Formula 3 and polymerizing the monomers to form a terpolymer:

<Formula 2>

<Formula 3>

<Formula 4> wherein $R_1$, $R_2$ and $R_3$ are independently H or $CH_3$, $R_4$ is selected from $-C\equiv N$, $-C(=O)OCH_3$ and groups represented by the following structural formulae:

and n is in the range of from 1 to 45.

Reaction conditions for copolymerization are not particularly limited, and any suitable conditions and reaction medium may be used to effect polymerization. Suitable polymerization medium include solution polymerization, gas phase polymerization, fluidized bed polymerization, and hybrids of these medium. Solution polymerization is particularly preferred for use in polymerizing the monomers of the present invention.

In solution polymerization, a solvent typically is added for additive polymerization. According to this technique, the reaction mixture holds flowability (i.e., the reaction mixture remains flowable) until the polymerization is completed, so that polymerization heat is easily removed, thereby obtaining a homogeneous polymer. It is preferred that the temperature for copolymerization be within the range of from about 70 to about 90° C., and the preferred reaction time is within the range of from about 4 to about 24 hours. Also, reaction solvents for the solution polymerization vary depending on to the type(s) of monomer used. Examples of solvents preferred for use in this invention include tetrahydrofuran, dimethylsulfoxide and 1,4-dioxane. Those skilled in the art are capable of using any suitable solvent to aid in polymerization, using the guidelines provided herein.

In order to promote reactivity of copolymerization, a polymerization initiator exemplified by benzoyl peroxide or azobisisobutyronitrile may be used. The content of the polymerization initiator preferably is in the range of from 0.1 to 1 parts by weight based on 100 parts by weight of the monomer, from the viewpoints of the reaction yield.

During the copolymerization, the content of polyethylene glycol methylether methacrylate preferably is in the range of from 10 to 50% by mol, and the content of 2,2,2-trifluoroethyl methacrylate preferably is in the range of from 50 to 90% by mol. In the case of further adding the monomer represented by Formula 4 to the monomer mixture, the content of polyethylene glycol methylether methacrylate preferably is in the range of from 5 to 50% by mol, the content of 2,2,2-trifluoroethyl methacrylate preferably is in the range of from 5 to 50% by mol, and the content of the monomer represented by Formula 4 preferably is in the range of from 5 to 90% by mol.

If the content of PEGMA falls below the above ranges, the ionic conductivity of the copolymer may become poor. If the content of PEGMA exceeds the above range, the crystallinity of the copolymer may be increased. Also, if the content of TFEMA falls below the above range, the mechanical properties of the copolymer may become poor. If the content of TFEMA exceeds the above range, the ionic conductivity of the copolymer may be undesirably decreased. If the content of the monomer represented by Formula 4 falls below the above range, the mechanical properties of the copolymer may become poor, and the affinity to an electrolytic solution may be reduced. If the content of the monomer represented by Formula 4 exceeds the above range, the ionic conductivity of the copolymer may be undesirably decreased.

During the copolymerization, the weight average molecular weight of PEGMA preferably is in the range of from about 150 to about 2,100, more preferably in the range of from about 300 to about 1,100. If the weight average molecular weight of PEGMA is greater than 2100, the crystallinity of PEGMA may become high, resulting in a potential increase in the crystallinity of the copolymer prepared therefrom.

By the use of the thus-prepared fluoride copolymer represented by Formula 1, polymer electrolytes having good mechanical strength, high ionic conductivity and improved adhesion to electrodes, can be obtained. These polymer electrolytes can be used without limitation, and can be advantageously used for lithium batteries. Particularly, these polymer electrolytes can be used as gel or solid polymer electrolytes in lithium polymer batteries using lithium metal composite oxides as cathode active materials, and can be more advantageously used as polymer electrolytes in lithium metal/sulfur batteries using sulfur as cathode active materials and using lithium metal as anodes.

The polymer electrolyte according to the present invention preferably comprises a fluoride copolymer represented by Formula 1 and a lithium salt, or comprises a fluoride copolymer represented by Formula 1 and an electrolytic solution including a lithium salt and an organic solvent.

The polymer electrolyte preferably is prepared by the following method. First, a fluoride copolymer represented by Formula 1 and a lithium salt are dissolved in a first organic solvent to prepare a polymer electrolyte composition. Here, preferred examples of the fluoride copolymer include a PEGMA-TFEA copolymer, a PEGMA-TFEA-AN copolymer, a PEGMA-TFEA-MMA copolymer, a PEGMA-TFEA-VP copolymer, a PEGMA-TFEA-TMVS copolymer, a PEGMA-TFEA-EEA copolymer, and mixtures thereof. Particularly, x is preferably in the range of from 5 to 200, y is preferably in the range of from 10 to 800, z is preferably in the range of from 100 to 1,500, and n is in the range of from 4 to 23. Within these ranges, the polymer electrolyte has good mechanical properties and good ionic conductivity.

Examples of the lithium salt include one or more selected from $LiClO_4$, $LiCF_3SO_3$, $LiPF_6$, $LiN(CF_3SO_2)_2$, $LiBF_4$, and mixtures thereof. The content of the lithium salts preferably is in the range of from 5 to 50 parts by weight, based on 100 parts by weight of the fluoride copolymer. If the content of the lithium salt is less than 5 parts by weight, the ionic conductivity of the copolymer may be low. If the content of the lithium salt is greater than 50 parts by weight, recombination of lithium ions and precipitation of lithium may undesirably occur.

Any organic solvent that dissolves the fluoride copolymer and the lithium salt can be used as the first organic solvent. Suitable examples of the first organic solvent include acetonitrile (ACN), tetrahydrofuran, acetone, and mixtures thereof. The content of the first organic solvent preferably is in the range of from 200 to 800 parts by weight, based on 100 parts by weight of the fluoride copolymer. When the content of the first organic solvent is within the above range, coating of the polymer electrolyte composition can be easily performed.

A separate support film or electrode then preferably is coated with the composition and dried, thereby obtaining a polymer electrolyte. The drying can be performed at room temperature or at 50° C. to remove components of the first organic solvent. Any suitable support film can be used, including, for example, a glass substrate, a mylar film, a polyethylene terephthalate film, or a Teflon film.

Coating of the polymer electrolyte composition can be effected by any suitable coating method now known or later discovered, and is not limited to any special coating procedure. A doctor blade method preferably is used to coat the composition.

Polyethylene glycol dimethylether (PEGDME) as an oligomer additive may further be added to the composition for forming the polymer electrolyte according to the present invention. Addition of PEGDME is believed to improve the mechanical strength and ionic conductivity of the polymer electrolyte. The content of PEGDME preferably is in the range of from 10 to 200 parts by weight, more preferably in the range of from 50 to 150 parts by weight, based on 100 parts by weight of the fluoride copolymer. If the content of PEGDME is greater than 200 parts by weight, the mechanical strength of the polymer electrolyte may be undesirably reduced. If the content of PEGDME is less than 10 parts by weight, the effect of improving the ionic conductivity of the polymer electrolyte may be negligible.

Alternatively, a second organic solvent useful in forming the electrolytic solution may further be added to the polymer electrolyte composition. Usable examples of the second organic solvent include one or more selected from ethylene carbonate (EC), propylene carbonate (PC), dimethyl carbonate (DMC), ethylmethyl carbonate (EMC), dipropyl carbonate, diethoxy ethane, dimethoxy ethane, γ-butyrolactone, dioxolane, sulfolane, diethylene glycol dimethylether, tetraethylene glycol dimethylether, and mixtures thereof. The content of the second organic solvent preferably is in the range of from 50 to 400 parts by weight, based on 100 parts by weight of the fluoride copolymer.

In some cases, a ceramic filler may further be added for the purpose of improving the mechanical strength and ionic conductivity in the course of manufacturing the polymer electrolyte composition. Usable examples of the ceramic filler include silica, alumina, lithium aluminate and zeolite. The content of the ceramic filler preferably is in the range of from 10 to 50 parts by weight, based on 100 parts by weight of the fluoride copolymer. If the content of the ceramic filler is less than 10 parts by weight, the effect exhibited by adding the ceramic filler may be negligibly insignificant. If the content of the ceramic filler is greater than 50 parts by weight, viscosity of the polymer electrolyte composition may be excessively increased.

The thus-obtained polymer electrolyte according to the present invention is of the solid or gel type, and includes none or only a small amount of the second organic solvent. Since the polymer electrolyte contains fluorine, it has superb mechanical properties and high ionic conductivity.

Now, a method of manufacturing a lithium secondary battery using the polymer electrolyte according to the present invention will be described. First, a cathode and an anode are prepared by generally known methods to those skilled in the art. Active materials for the cathode are not specifically limited, and usable examples thereof include lithium composite oxides such as $LiCoO_2$, $LiNiO_2$, $LiMnO_2$ or $LiMn_2O_4$, and sulfur. As active materials for the anode, carbon or graphite may be used. Otherwise, a thin film made of lithium metal itself may be used as the anode. In some cases, the cathode and the anode may be digested in an electrolytic solution to impregnate the electrolytic solution into the cathode and the anode. In this case, the electrolytic solution typically is comprised of the lithium salt and the second organic solvent used in the preparation of the polymer electrolyte. If the electrolytic solution is impregnated into the cathode and the anode in such a manner, the movement of lithium ions is promoted, thereby improving the ionic conductivity. Then, the cathode and the anode are fixed to support films, respectively.

Thereafter, the polymer electrolyte composition prepared in the above-described method is cast on the cathode and/or anode supported to the support films, and dried, thereby preparing a polymer electrolyte. Then, the prepared polymer electrolyte is interposed between the cathode and the anode.

As described above, the polymer electrolyte preferably is prepared by casting the composition on the cathode and/or the anode and drying the resultant product. Alternatively, a separate support film may be cast with the polymer electrolyte composition and dried, and the polymer electrolyte is then peeled off from the support film. Then, the polymer electrolyte, peeled off from the support film, preferably is interposed between the cathode and the anode, thereby forming an electrode assembly of a battery.

In the present invention, a separator may be further disposed between the cathode (or anode) and the polymer electrolyte. In this case, any suitable insulating material that has a network structure can be used as the separator. The separator provided in addition to the polymer electrolyte improves the mechanical strength of the polymer electrolyte.

Examples of the separator include a single layer of polyethylene film, a double layer of polyethylene/polypropylene or a triple layer of polyethylene/polypropylene/polyethylene. The thickness of the separator is preferably from 9 to 40 μm and the porosity thereof preferably is in the range of from 30 to 70%.

The lithium battery according to the present invention is not particularly limited in type, and includes both a lithium primary battery and a lithium secondary battery. In particular, the lithium battery according to the present invention preferably is a lithium metal/sulfur secondary battery having a cathode comprised of sulfur and using a thin film of lithium metal as an anode, or a lithium polymer secondary battery having a cathode comprised of a lithium metal composite oxide such as $LiCoO_2$ and an anode comprised of carbon or graphite.

The present invention now will be described in more detail with reference to the following examples, while not meant to be limited thereby.

SYNTHESIS EXAMPLE 1

To a reaction flask were added 2,2,2-trifluoroethyl acrylate (TFEA) (15.41 g, 0.1 mol), polyethylene glycol methylether methacrylate (PEGMA) having a weight average molecular weight of 1,100 (27.5 g, 0.025 mol) to be dissolved in 150 ml of tetrahydrofuran under $N_2$, followed by adding 0.05 g of benzoyl peroxide, for performing solution polymerization at 80° C. As the reaction proceeds, a highly viscous, yellow solution was produced. The solution polymerization was performed for about 18 hours. Then, the reaction mixture was added to pentane as a non-solvent, producing a yellow solid. The solid was vacuum-dried at 80° C. for about 24 hours, thereby synthesizing a PEGMA-TFEA copolymer (to be referred to as "FAMP" hereinafter) (yield: 95%).

Figure 1:
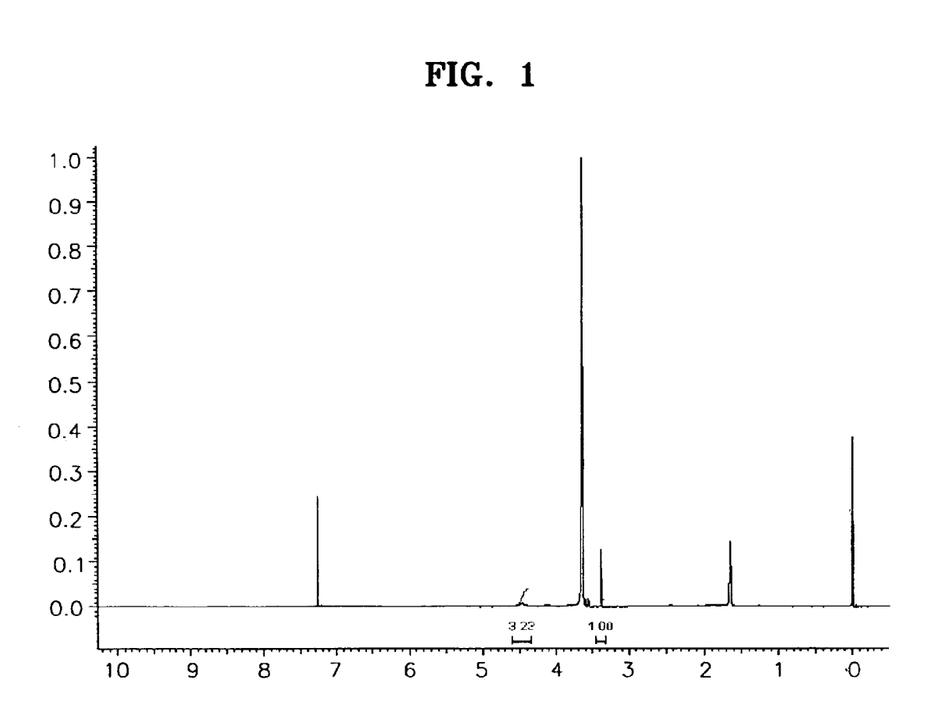
FIG. 1 shows a $^1$H-NMR spectrum of a polyethylene glycol methylether methacrylate-2,2,2-trifluoroethyl acrylate copolymer prepared by Synthesis Example 1 of the present invention.

The PEGMA-TFEA copolymer was analyzed by $^1$H-NMR, and the result is shown in FIG. 1, from which it was confirmed that PEGMA and TFEA existed in the molar ratio of 1:4. The weight average molecular weight of the copolymer was approximately 16,000, $x=9$, $y=36$, and $n=23$.

SYNTHESIS EXAMPLE 2

A PEGMA-TFEA-AN copolymer (to be referred to as "TAMP" hereinafter) was synthesized by the same method as in Synthesis Example 1, except that acetonitrile (ACN) (60 g, 1.13 mol) was further added to a mixture of PEGMA and TFEA (yield: 45%).

Figure 2:
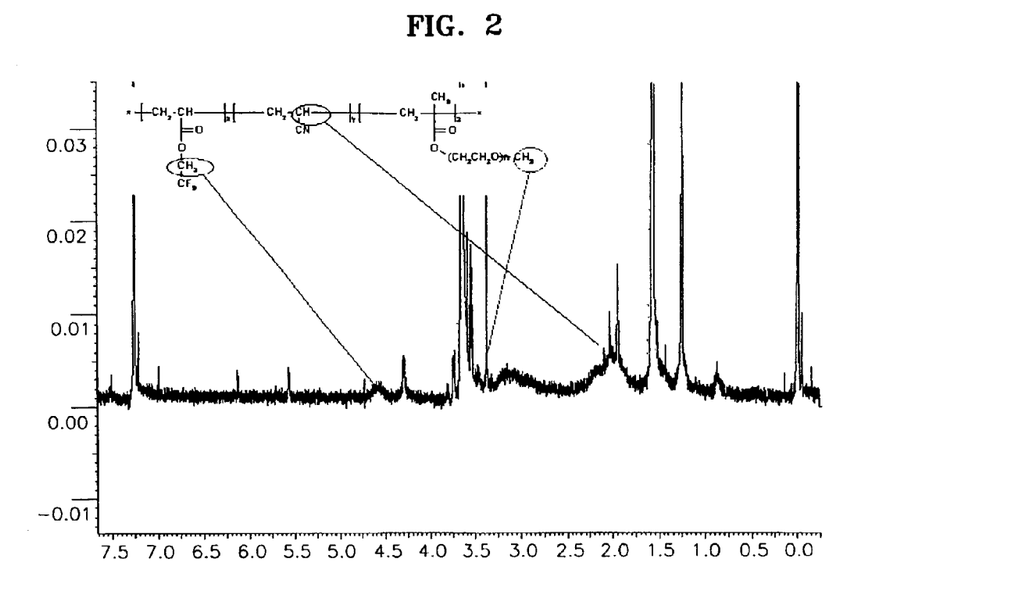
FIG. 2 shows a $^1$H-NMR spectrum of a polyethylene glycol methylether methacrylate-2,2,2-trifluoroethyl acrylate-acrylonitrile copolymer prepared by Synthesis Example 2 of the present invention.

The PEGMA-TFEA-AN copolymer was analyzed by $^1$H-NMR, and the result is shown in FIG. 2. The weight average molecular weight of the copolymer was approximately 45,000, $x=24$, $y=28$, $Z=288$, and $n=23$.

SYNTHESIS EXAMPLES 3–6

A PEGMA-TFEA-MMA copolymer, a PEGMA-TFEA-VP copolymer, a PEGMA-TFEA-TMVS copolymer and a PEGMA-TFEA-EEA copolymer were synthesized by the same method as in Synthesis Example 2, except that MMA, VP, TMVS and EEA were used, respectively, instead of AN.

The weight average molecular weight of the PEGMA-TFEA-MMA copolymer was 87,000, x=22, y=55, z=506, and n=23. The weight average molecular weight of the PEGMA-TFEA-VP copolymer was 130,000, x=21, y=74, z=840, and n=23. The weight average molecular weight of the PEGMA-TFEA-TMVS copolymer was 43,000, x=14, y=28, z=168, and n=23. The weight average molecular weight of the PEGMA-TFEA-EEA copolymer was 120,000, x=18, y=56, z=612, and n=23.

EXAMPLE 1

LiCF$_3$SO$_3$ (0.2 g) was added to 2 g of a PEGMA-TFEA copolymer prepared by mixing PEGMA and TFEA in a molar ratio of 1:1, and completely dissolved in 5 g of CAN. The solution then was coated on a glass substrate using a doctor blade. Next, the resultant product was dried for solvent removal, thereby preparing a polymer electrolyte.

EXAMPLES 2–5

Polymer electrolytes were prepared by the same method as in Example 1, except that the molar ratios of mixtures of PEGMA and TFEA in the PEGMA-TFEA copolymer were changed to 1:3, 1:5, 1:7 and 1:10, respectively.

For the polymer electrolytes prepared in Examples 1–5, the ionic conductivity and mechanical properties were measured, and the results are shown in Table 1. Here, the ionic conductivities were measured after forming the polymer electrolytes into thin films and cutting the same into sizes of 1 cm$^2$ in area. The mechanical properties were evaluated by extents of manageability of the films.

TABLE 1

| | Mixed molar ratio of PEGMA to TFEA in PEGMA-TFEA copolymer | | | | |
| --- | --- | --- | --- | --- | --- |
| | 1:1 | 1:3 | 1:5 | 1:7 | 1:10 |
| Ionic conductivity (S/cm) | 5.26 × 10$^{-5}$ | 3.82 × 10$^{-5}$ | 2.58 × 10$^{-5}$ | 6.84 × 10$^{-6}$ | 1.83 × 10$^{-6}$ |
| Mechanical property | Poor | Poor | Good | Good | Excellent |

From Table 1, it is confirmed that the mechanical property of a polymer electrolyte is weakened as the content of PEGMA increases, and the ionic conductivity thereof becomes poorer as the content of TFEA increases.

EXAMPLE 6

To a mixture of PEGMA (0.025 mol) and TFEA (0.125 mol) was added one monomer (0.5 mol) selected from AN, MMA, VP, TMVS and EEA, respectively, and reacted to thereby prepare a PEGMA-TFEA-X ter-copolymer where X is AN, MMA, VP, TMVS or EEA.

An electrolytic solution (1.0M LiPF$_6$ in EC/PC mixed in a volumetric ratio of 1:1) was added to the respective ter-copolymers, thereby preparing gel-type polymer electrolytes. The content of each of the ter-copolymers was 200 parts by weight, based on 100 parts by weight of the ter-copolymer.

The ionic conductivities of the gel-type polymer electrolytes were measured and the results are shown in Table 2.

TABLE 2

| | Tertiary copolymer of PEGMA-TFEA-X | | | | |
| --- | --- | --- | --- | --- | --- |
| X monomer | AN | MMA | VP | TMVS | EEA |
| Ionic conductivity (S/cm) | 2.35 × 10$^{-3}$ | 6.67 × 10$^{-4}$ | 1.83 × 10$^{-3}$ | 3.97 × 10$^{-4}$ | 5.18 × 10$^{-4}$ |
| Mechanical property | Good | Excellent | Good | Good | Excellent |

From Table 2, it is understood that a change in the ionic conductivity is not so great depending on the type of monomer X used, and the mechanical property is particularly good, in the case where the monomer X is an acrylate-based monomer.

EXAMPLE 7

To 2 g of the TAMP copolymer prepared in Example 6 were added lithium salts (LiCF$_3$SO$_3$) in such amounts as listed in Table 3, based on 100 parts by weight of the copolymer. The mixtures were dissolved in 5 g of ACN, followed by coating on a glass substrate using a doctor blade. Thereafter, the resultant product was dried at room temperature for solvent removal, thereby preparing solid polymer electrolytes.

The mechanical strengths and ionic conductivities of the prepared solid polymer electrolytes were measured by the same manner as in Example 2. The mechanical strengths were good enough to facilitate film manipulation, and the ionic conductivities are shown in Table 3.

TABLE 3

| | 1 | 2 | 3 | 4 |
| --- | --- | --- | --- | --- |
| Content of LiCF$_3$SO$_3$ | 5 parts by weight | 10 parts by weight | 15 parts by weight | 20 parts by weight |
| Ionic conductivity (S/cm) | 5.23 × 10$^{-8}$ | 8.52 × 10$^{-8}$ | 1.37 × 10$^{-7}$ | 4.68 × 10$^{-7}$ |

Referring to Table 3, the solid polymer electrolytes prepared in Example 7 have better ionic conductivities as the content of the lithium salts increases.

EXAMPLE 8

To the TAMP copolymer prepared in Example 6 were added polyethylene glycol dimethylether having a weight average molecular weight of 250 (to be abbreviated as "PEGDME 250") and LiCF$_3$SO$_3$. The mixture was dissolved in ACN, followed by coating on a glass substrate using a doctor blade. All contents of the respective components are indicated by "parts by weight", unless otherwise indicated. Thereafter, the resultant product was dried at room temperature for solvent removal, thereby preparing polymer electrolytes.

The ionic conductivities of the prepared polymer electrolytes were measured, and the results are shown in Table 4.

TABLE 4

|  | 1 | 2 | 3 | 4 | 5 | 6 | 7 |
|---|---|---|---|---|---|---|---|
| TAMP | 0.4 | 0.5 | 0.6 | 0.7 | 0.8 | 0.85 | 0.9 |
| PEGDME 250 | 0.6 | 0.5 | 0.4 | 0.3 | 0.2 | 0.15 | 0.1 |
| LiCF$_3$SO$_3$ | 0.1 | 0.1 | 0.1 | 0.1 | 0.1 | 0.1 | 0.1 |
| CAN | 3 | 3 | 4 | 4 | 5 | 5 | 5 |
| Ionic conductivity (S/cm) | $9.67 \times 10^{-5}$ | $6.51 \times 10^{-5}$ | $2.75 \times 10^{-5}$ | $8.50 \times 10^{-6}$ | $1.55 \times 10^{-6}$ | $8.41 \times 10^{-7}$ | $6.15 \times 10^{-7}$ |

It is confirmed from Table 4 that the ionic conductivities of polymer electrolytes are increased as the content of PEGDME increases.

EXAMPLE 9

Polymer electrolytes were prepared by the same method as in Example 8, except that polyethylene glycol dimethylether having a weight average molecular weight of 500 (to be abbreviated as "PEGDME 500") was used instead of PEGDME 250.

The ionic conductivities of the prepared polymer electrolytes were measured, and the results are shown in Table 5. In Table 5, all contents of the respective components are indicated by "parts by weight", unless otherwise indicated.

TABLE 5

|  | 1 | 2 | 3 | 4 | 5 | 6 | 7 |
|---|---|---|---|---|---|---|---|
| TAMP | 0.4 | 0.5 | 0.6 | 0.7 | 0.8 | 0.85 | 0.9 |
| PEGDME 500 | 0.6 | 0.5 | 0.4 | 0.3 | 0.2 | 0.15 | 0.1 |
| LiCF$_3$SO$_3$ | 0.1 | 0.1 | 0.1 | 0.1 | 0.1 | 0.1 | 0.1 |
| ACN | 3 | 3 | 4 | 4 | 5 | 5 | 5 |
| Ionic conductivity (S/cm) | $3.60 \times 10^{-5}$ | $1.98 \times 10^{-5}$ | $7.56 \times 10^{-6}$ | $6.54 \times 10^{-6}$ | $1.45 \times 10^{-6}$ | $7.69 \times 10^{-7}$ | $6.36 \times 10^{-7}$ |

It is understood from Table 5 that the ionic conductivities of the polymer electrolytes are increased as the content of PEGDME increases. In the polymer electrolytes prepared in Examples 8 and 9, changes in the ionic conductivity depending on a change in the content of PEGDME are shown in FIG. 3.

Figure 3:
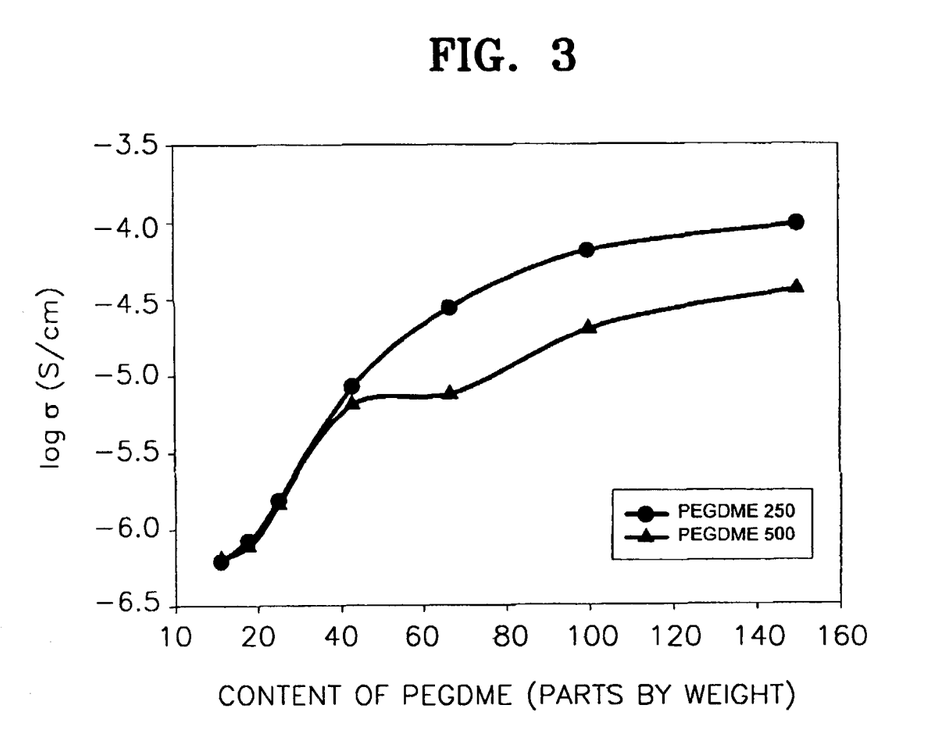
FIG. 3 shows a change in ionic conductivity of polymer electrolytes prepared in Examples 8 and 9 of the present invention, depending on a change in the concentration of polyethylene glycol dimethylether.

As shown in FIG. 3, assuming that the compositions of the prepared polymer electrolytes are the same, the ionic conductivities of the polymer electrolytes are higher when PEGDME 250 is used than when PEGDME 500 is used.

EXAMPLE 10

To 50 parts by weight of TAMP prepared in Example 6 were added 50 parts by weight of PEGDME 250 and LiCF$_3$SO$_3$ in amounts varying from 5, 10, 15, and 20 parts by weight. The mixtures were dissolved in 300 parts by weight of ACN, followed by coating on a glass substrate using a doctor blade. Thereafter, the resultant product was dried at room temperature for solvent removal, thereby preparing polymer electrolytes.

Also, to 50 parts by weight of TAMP prepared in Example 6 were added 50 parts by weight of PEGDME 500 and LiCF$_3$SO$_3$ with its amounts varying from 5, 10, 15, and 20 parts by weight. The mixtures were dissolved in 300 parts by weight of ACN, followed by coating on a glass substrate using a doctor blade. Thereafter, the resultant product was dried at room temperature for solvent removal, thereby preparing polymer electrolytes.

Figure 4:
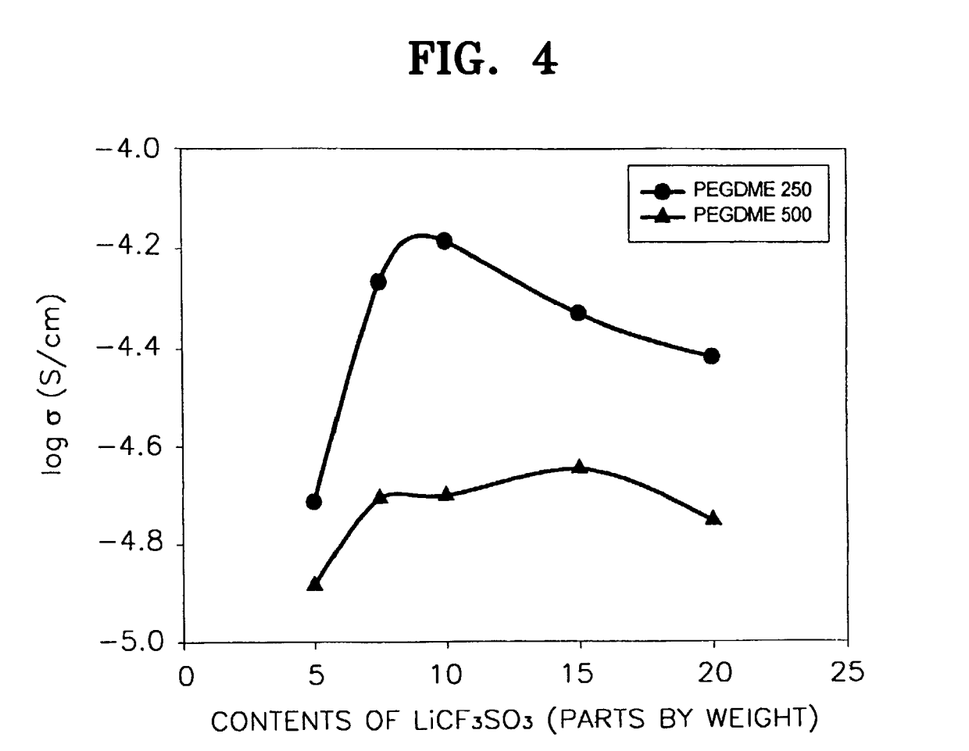
FIG. 4 shows a change in ionic conductivity of polymer electrolyte prepared in Example 9 of the present invention, depending on a change in the concentration of a lithium salt.

The mechanical strengths and ionic conductivities of the prepared solid polymer electrolytes were measured. The results revealed that the mechanical strengths were good enough to facilitate film manipulation, and the ionic conductivities are shown in FIG. 4. As shown in FIG. 4, the polymer electrolytes prepared using PEGDME 250 exhibit the highest ionic conductivities when the content of LiCF$_3$SO$_3$ was approximately 10 parts by weight. Also, the polymer electrolytes prepared using PEGDME 500 exhibit the highest ionic conductivities when the content of LiCF$_3$SO$_3$ was approximately 15 parts by weight.

EXAMPLE 11

The FAMP and TAMP copolymers prepared in Synthesis Examples 1 and 2 were mixed, and PEGDME 250 and LiCF$_3$SO$_3$ were added thereto, and dissolved in ACN, followed by coating on a glass substrate using a doctor blade. The contents of the respective components were changed in amounts as listed in Table 6, and all contents of the respective components are indicated by "parts by weight," unless otherwise indicated.

TABLE 6

|  | 1 | 2 | 3 | 4 |
|---|---|---|---|---|
| FAMP | 0.1 | 0.2 | 0.1 | 0.2 |
| TAMP | 0.4 | 0.4 | 0.3 | 0.3 |
| PEGDME 250 | 0.5 | 0.4 | 0.6 | 0.5 |
| LiCF$_3$SO$_3$ | 0.1 | 0.1 | 0.1 | 0.1 |
| Ionic conductivity (S/cm) | $5.47 \times 10^{-5}$ | $9.05 \times 10^{-6}$ | $1.56 \times 10^{-4}$ | $7.18 \times 10^{-5}$ |

Referring to Table 6, the ionic conductivities of the polymer electrolytes were increased when a small amount of FAMP is added, the content of TAMP is reduced and the content of PEGDME is increased, which promotes the movement of lithium ions.

EXAMPLE 12

LiCoO$_2$, (68.5 parts by weight), 1.5 parts by weight of Super-P and 1.5 parts by weight of polyvinylidene fluoride were mixed with 28.5 parts by weight of NMP to prepare a cathode forming composition. Then, an aluminum current collector was coated with the cathode forming composition and dried, thereby preparing a cathode.

Carbon, (53.6 parts by weight), 3.4 parts by weight of polyvinylidene fluoride were mixed with 43 parts by weight of NMP to prepare an anode forming composition. Then, a copper current collector was coated with the anode forming composition and dried, thereby preparing an anode.

The prepared cathode and anode were immersed in an electrolytic solution (1.0M LiPF$_6$ in EC/PC of a mixed volumetric ratio of 1:1) to impregnate the electrolytic solution into the cathode and the anode. The cathode and the anode were fixed on a mylar film using a double-sided adhesive tape. 200 parts by weight of the electrolytic solution were added to the polymer electrolyte composition prepared by dissolving 100 parts by weight of TAMP in 300 parts by weight of ACN, and then the cathode and the anode were coated with the polymer electrolyte.

Thereafter, the mylar film was removed from the resultant product. Then, a polyethylene separator was disposed on the polymer electrolyte and fixed using glass to prevent movement. Electrode terminals were adhered to the resultant product, wrapped with a blue bag and hermetically sealed, followed by compressing at high pressure to make the cathode, polymer electrolyte and anode adhere closely to each other, thereby completing a lithium polymer battery.

EXAMPLE 13

Sulfur, (55 parts by weight), 28 parts by weight of Super-P and 17 parts by weight of polyethylene oxide were mixed to prepare a cathode active material composition. A cathode current collector was coated with the cathode active material composition and dried to prepare a cathode.

A lithium metal film itself was used as an anode. A polyethylene separator coated with a polymer electrolyte was disposed on the lithium metal anode and the prepared cathode was disposed on the polymer electrolyte, thereby completing a lithium metal/sulfur battery. The polyethylene separator coated with a polymer electrolyte was prepared in the following manner.

A polymer electrolyte composition was prepared by dissolving 50 parts by weight of TAMP, 50 parts by weight of PEGMDE 250 and 10 parts by weight of LiCF$_3$SO$_3$ in a 300 parts by weight of ACN. A polyethylene film was immersed in the polymer electrolyte composition and dried, producing a polyethylene separator coated with a polymer electrolyte.

Figure 6:
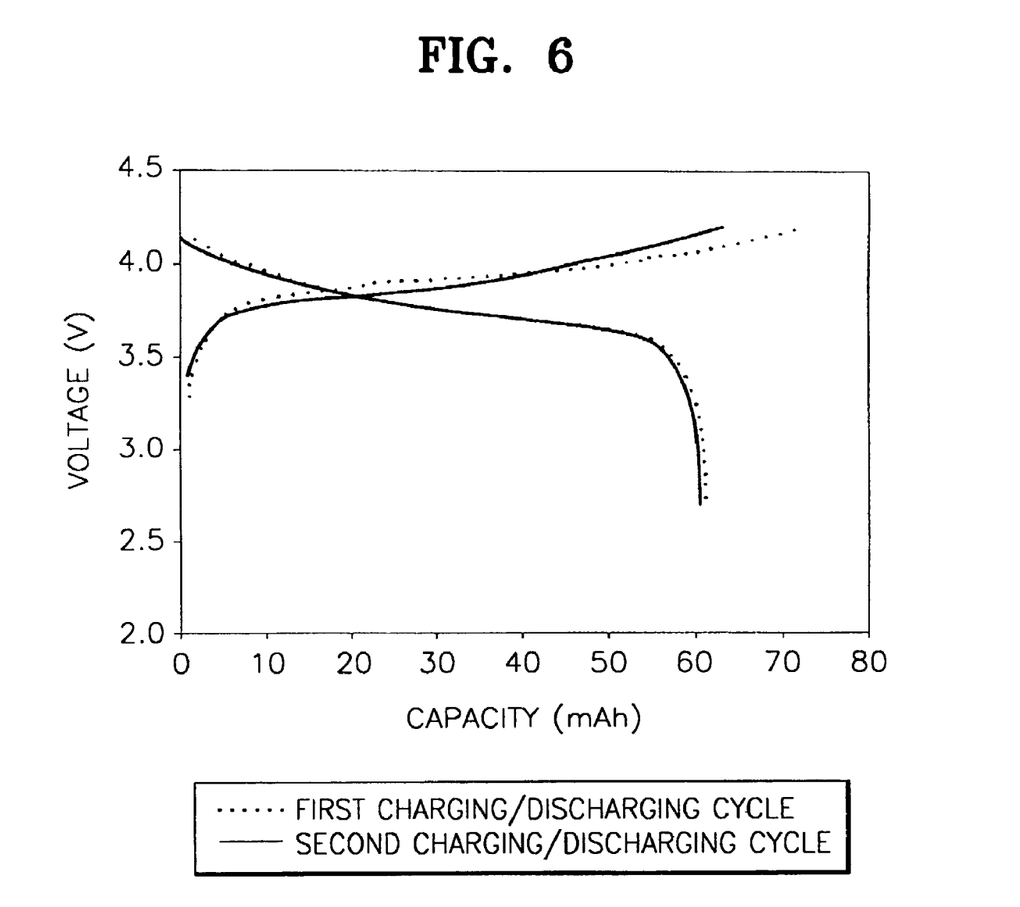
FIG. 6 shows formation curves of a lithium polymer battery prepared in Example 12 of the present invention.

The lithium polymer battery prepared in Example 12 was subjected to charging/discharging cycle tests, and the results are shown in FIG. 6. The charging/discharging cycle tests were performed under the current rate condition of 0.2 C and at a voltage range of 2.7–4.2 V. Referring to FIG. 6, during an initial stage of charging and discharging, very stable charging and discharging states are exhibited without side reaction peaks caused by electrodes and electrolyte.

Figure 7:
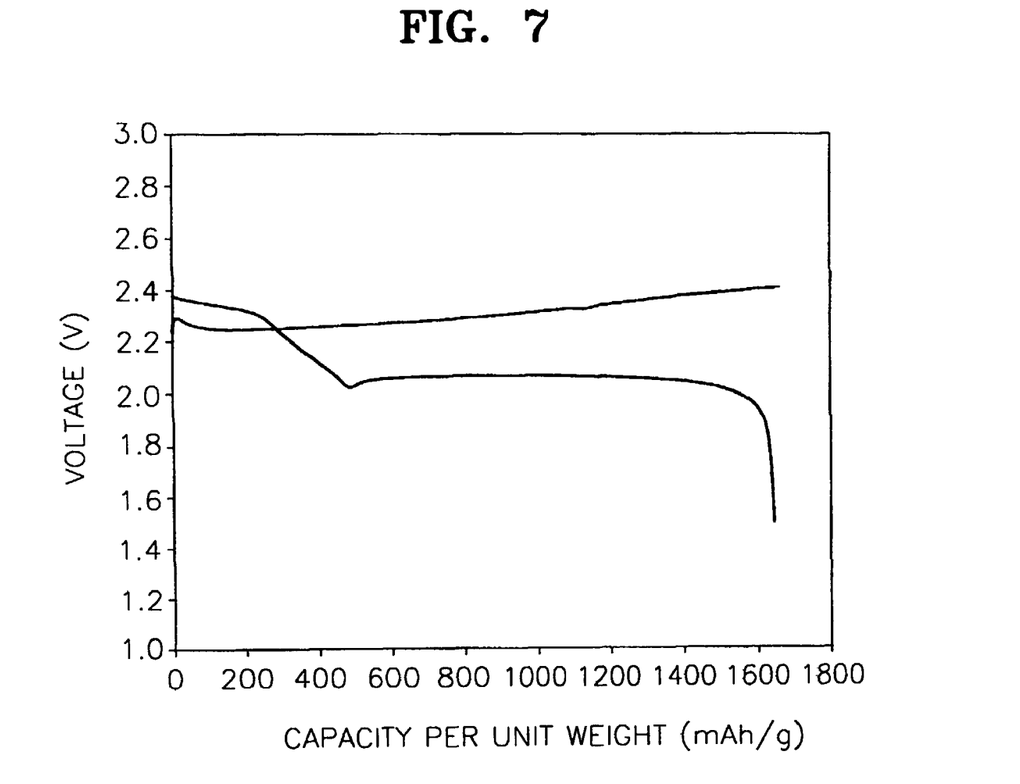
FIG. 7 shows a formation curve of a lithium metal/sulfur battery prepared in Example 13 of the present invention.

Then, the lithium metal/sulfur polymer battery prepared in Example 13 was subjected to charging/discharging cycle tests, and the results are shown in FIG. 7. The charging/discharging cycle tests were performed under the current rate condition of 0.25 C and at a voltage range of 1.5–2.8 V.

Compared to the case of using only the conventional liquid electrolyte, a better adhesiveness between the polymer electrolyte and the electrode is attributable to the use of a polymer electrolyte. Also, as shown in FIG. 7, a discharge capacity close to a theoretical capacity of sulfur, that is, 1674 mAh/g, was provided, which means that the polymer electrolyte can increase reversibility of polysulfide generated in the lithium metal/sulfur battery.

According to the present invention, the fluoride copolymer represented by Formula 1 has low crystallinity so that it is good in view of mechanical properties, thermal stability and chemical stability, without impeding movement of lithium ions.

When the fluoride copolymer according to the present invention is used for a polymer electrolyte, the prepared polymer electrolyte has the following advantages. First, since the fluoride copolymer has low crystallinity, its processing efficiency is high, and it can easily be made into a thin film because of its good mechanical property. Second, since the fluoride copolymer has very low crystallinity at room temperature and components capable of moving lithium ions exist in a polymer matrix, the fluoride copolymer can be used as a solid electrolyte with none or a small amount of an electrolytic solution. Thus, side reactions due to use of an excess electrolytic solution do not occur. Third, good adhesiveness between a polymer electrolyte and electrode is exhibited.

A lithium battery manufactured by employing the polymer electrolyte having the above-described advantages has improved electrochemical characteristics, including high ionic conductivity, and good charging/discharging cycle characteristics.

While the invention has been described with reference to particularly preferred embodiments and examples, those skilled in the art will appreciate that various modifications may be made thereto without departing from the spirit and scope of the invention.

What is claimed is:

1. A polymer electrolyte comprising:
a fluoride copolymer represented by Formula 1:

<Formula 1> wherein R$_1$, R$_2$ and R$_3$ are independently H or CH$_3$, R$_4$ is selected from the group consisting of —C≡N, —C(=O)OCH$_3$ and groups represented by the following structural formulae:

n is in the range of from 1 to 45, x is in the range of from 5 to 200, y is in the range of from 10 to 800, and z is in the range of from 0 to 2,000;

a lithium salt selected from the group consisting of $LiClO_4$, $LiCF_3SO_3$, $LiPF_6$, $LiN(CF_3SO_2)_2$, $LiBF_4$, and mixtures thereof, wherein the content of the lithium salt is in the range of from 5 to 50 parts by weight, based on 100 parts by weight of the fluoride copolymer; and polyethylene glycol dimethylether, wherein the content of the polyethylene glycol dimethylether is in the range of from 10 to 200 parts by weight, based on 100 parts by weight of the fluoride copolymer.

2. The polymer electrolyte as claimed in claim 1, further comprising an organic solvent selected from the group consisting of ethylene carbonate, propylene carbonate, dimethyl carbonate, ethylmethyl carbonate, dipropyl carbonate, diethoxy ethane, dimethoxy ethane, γ-butyrolactone, dioxolane, sulfolane, diethylene glycol dimethylether, tetraethylene glycol dimethylether, and mixtures thereof, wherein the content of the organic solvent is within the range of from 50 to 400 parts by weight, based on 100 parts by weight of the fluoride copolymer.

3. The polymer electrolyte as claimed in claim 1, further comprising a ceramic filler selected from the group consisting of silica, alumina, lithium aluminate, zeolite, and mixtures thereof, wherein the content of the ceramic filler is within the range of from 10 to 50 parts by weight, based on 100 parts by weight of the fluoride copolymer.

4. A lithium battery comprising:

a cathode, an anode and a polymer electrolyte comprising a fluoride copolymer represented by Formula 1 interposed between the cathode and the anode:

wherein $R_1$, $R_2$ and $R_3$ are independently H or $CH_3$, $R_4$ is selected from the group consisting of —C≡N, —C(=O)$OCH_3$ and groups represented by the following structural formulae:

n is in the range of from 1 to 45, x is in the range of from 5 to 200, y is in the range of from 10 to 800, and z is in the range of from 0 to 2,000;

a lithium salt selected from the group consisting of $LiClO_4$, $LiCF_3SO_3$, $LiPF_6$, $LiN(CF_3SO_2)_2$, $LiBF_4$, and mixtures thereof, wherein the content of the lithium salt is within the range of from 5 to 50 parts by weight, based on 100 parts by weight of the fluoride copolymer; and polyethylene glycol dimethylether, wherein the content of the polyethylene glycol dimethylether is within the range of from 10 to 200 parts by weight, based on 100 parts by weight of the fluoride copolymer.

5. The lithium battery as claimed in claim 4, further comprising an organic solvent selected from the group consisting of ethylene carbonate, propylene carbonate, dimethyl carbonate, ethylmethyl carbonate, dipropyl carbonate, diethoxy ethane, dimethoxy ethane, γ-butyrolactone, dioxolane, sulfolane, diethylene glycol dimethylether, tetraethylene glycol dimethylether, and mixtures thereof, wherein the content of the organic solvent is within the range of from 50 to 400 parts by weight, based on 100 parts by weight of the fluoride copolymer.

6. The lithium battery as claimed in claim 4, further comprising a ceramic filler selected from the group consisting of silica, alumina, lithium aluminate, zeolite, and mixtures thereof, wherein the content of the ceramic filler is within the range of from 10 to 50 parts by weight, based on 100 parts by weight of the fluoride copolymer.

7. A polymer electrolyte comprising a fluoride copolymer represented by Formula 1:

wherein $R_1$, $R_2$ and $R_3$ are independently H or $CH_3$, $R_4$ is —C≡N, n is in the range of from 1 to 45, x is in the range of from 5 to 200, y is in the range of from 10 to 800, and z is in the range of from 100 to 1,500.

8. A lithium battery comprising a cathode, an anode and a polymer electrolyte comprising a fluoride copolymer represented by Formula 1 interposed between the cathode and the anode:

<Formula 1> wherein $R_1$, $R_2$ and $R_3$ are independently H or $CH_3$, $R_4$ is —C≡N, n is in the range of from 1 to 45, x is in the range of from 5 to 200, y is in the range of from 10 to 800, and z is in the range of from 100 to 1,500.

* * * * *